(12) United States Patent
Walther

(10) Patent No.: US 8,591,159 B2
(45) Date of Patent: Nov. 26, 2013

(54) SCREW HAVING UNDERSIDE POCKETS

(75) Inventor: Mirco Walther, Thunder Bay (CA)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 12/713,348

(22) Filed: Feb. 26, 2010

(65) Prior Publication Data

US 2011/0211934 A1 Sep. 1, 2011

(51) Int. Cl.
*F16B 39/282* (2006.01)

(52) U.S. Cl.
USPC ............................................. 411/187

(58) Field of Classification Search
USPC ............... 411/187, 188–189, 399, 160, 162, 411/386–187.8, 184–186
See application file for complete search history.

(56) References Cited

U.S. PATENT DOCUMENTS

| | | | | | |
|---|---|---|---|---|---|
| 493,585 | A | * | 3/1893 | Norman | 411/399 |
| 586,232 | A | * | 7/1897 | English | 411/399 |
| 844,750 | A | * | 2/1907 | Rieschick | 411/188 |
| 1,406,423 | A | * | 2/1922 | Smith | 411/143 |
| 1,527,831 | A | | 2/1925 | Borgner | |
| 1,923,647 | A | * | 8/1933 | Vera | 411/188 |
| 2,112,494 | A | * | 3/1938 | Olson | 411/187 |
| 2,833,326 | A | | 5/1958 | Knohl | |
| 2,959,204 | A | | 11/1960 | Rigot | |
| 2,982,166 | A | | 5/1961 | Hobbs | |
| 3,127,919 | A | * | 4/1964 | Swanstrom | 411/188 |
| 3,286,579 | A | * | 11/1966 | Lovisek | 411/386 |
| 3,370,631 | A | | 2/1968 | James | |
| 3,438,417 | A | | 4/1969 | Albris | |
| 3,903,784 | A | * | 9/1975 | Dekker | 411/399 |
| 4,094,352 | A | | 6/1978 | Hlinsky | |
| 4,220,188 | A | | 9/1980 | McMurray | |
| 4,310,272 | A | | 1/1982 | Rich et al. | |
| 4,470,736 | A | * | 9/1984 | Tasseron | 411/404 |
| 4,637,766 | A | * | 1/1987 | Milliser | 411/180 |
| 4,812,095 | A | | 3/1989 | Piacenti et al. | |
| 4,820,235 | A | | 4/1989 | Weber et al. | |
| 4,966,512 | A | | 10/1990 | Takaku | |
| 5,183,359 | A | | 2/1993 | Barth | |

(Continued)

FOREIGN PATENT DOCUMENTS

| | | |
|---|---|---|
| CA | 2198832 | 9/1997 |
| DE | 4121061 | 1/1993 |

(Continued)

OTHER PUBLICATIONS

International Search Report and Written Opinion from the corresponding Int'l Application No. PCT/CA2010/000658 dated Nov. 22, 2010.

(Continued)

*Primary Examiner* — Flemming Saether
(74) *Attorney, Agent, or Firm* — Snell & Wilmer L.L.P.

(57) ABSTRACT

A self-countersinking, self-tapping screw has a head with a substantially flat underside that acts like a washer for bearing against a surface of a material into which the screw is inserted. On an underside of the head are one or more material-receiving pockets. These pockets receive material when the head of the screw bears against the surface. These pockets thus help lock the screw in place, i.e. help to prevent the screw from loosening over time. These pockets may have a circular or non-circular shape.

20 Claims, 2 Drawing Sheets

(56) References Cited

U.S. PATENT DOCUMENTS

| | | | |
|---|---|---|---|
| 5,249,882 A | | 10/1993 | Nagoshi et al. |
| D368,019 S | * | 3/1996 | Ohtsuka ................... D8/387 |
| 5,509,766 A | * | 4/1996 | Leuschner .................. 411/187 |
| 5,564,873 A | * | 10/1996 | Ladouceur et al. .......... 411/180 |
| 5,622,464 A | | 4/1997 | Dill et al. |
| 5,683,217 A | * | 11/1997 | Walther et al. ............... 411/399 |
| 6,206,737 B1 | | 3/2001 | Bonilla et al. |
| 6,302,629 B1 | | 10/2001 | Hsiao |
| 6,334,748 B1 | | 1/2002 | Gudjonsson |
| 6,908,270 B1 | * | 6/2005 | Iwata ........................... 411/188 |
| 7,014,406 B2 | | 3/2006 | Robertson |
| 2007/0024020 A1 | | 2/2007 | Orford |

FOREIGN PATENT DOCUMENTS

| | | |
|---|---|---|
| DE | 4121061 | 6/1993 |
| JP | 93-17746 | 9/1997 |
| JP | 2003-021123 | 1/2003 |

OTHER PUBLICATIONS

USPTO; Office Action dated Dec. 14, 2011 in U.S. Appl. No. 12/561,931.

International Preliminary Report on Patentability for PCT/CA2010/000658 dated Apr. 23, 2012.

* cited by examiner

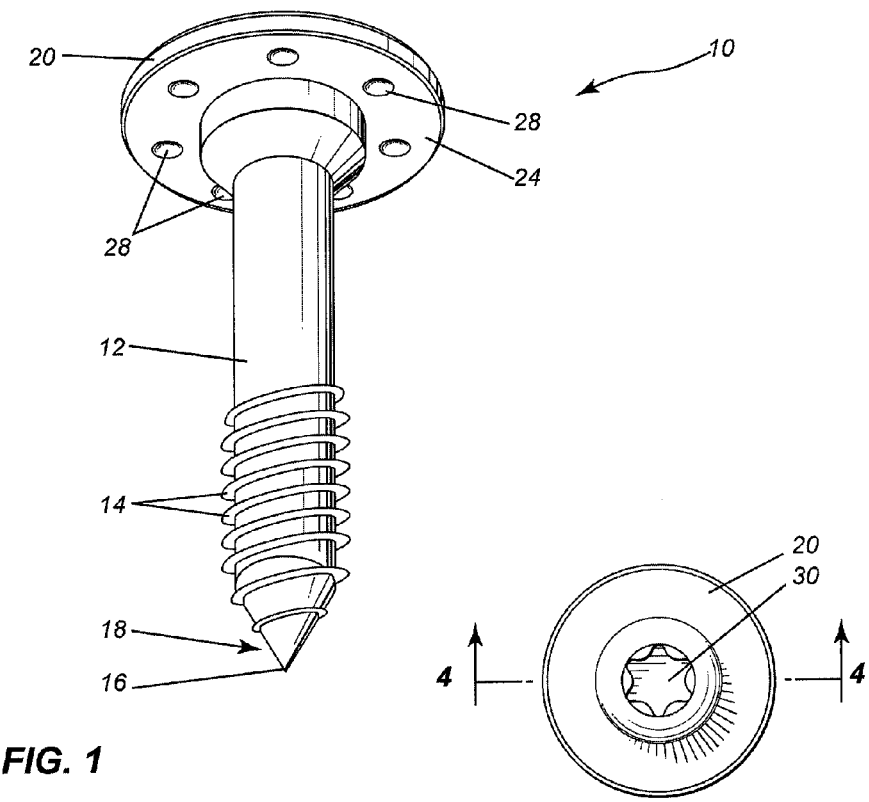
FIG. 1
FIG. 2
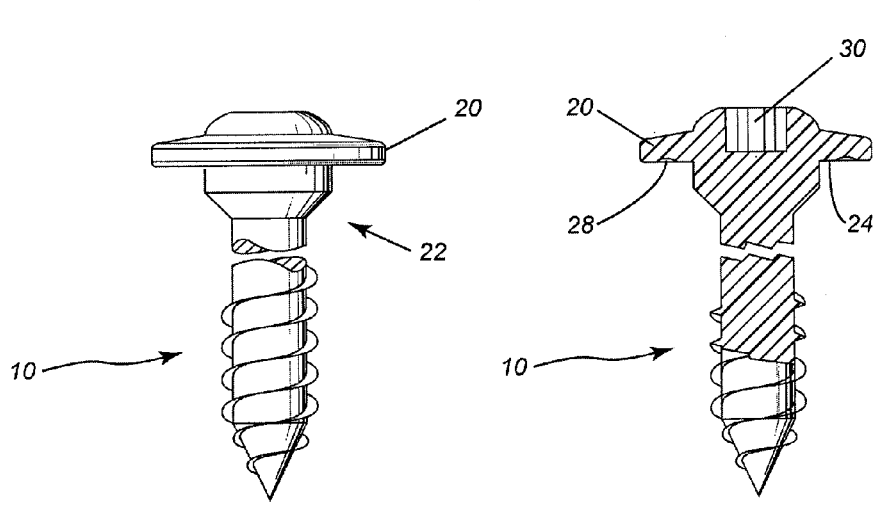
FIG. 3
FIG. 4

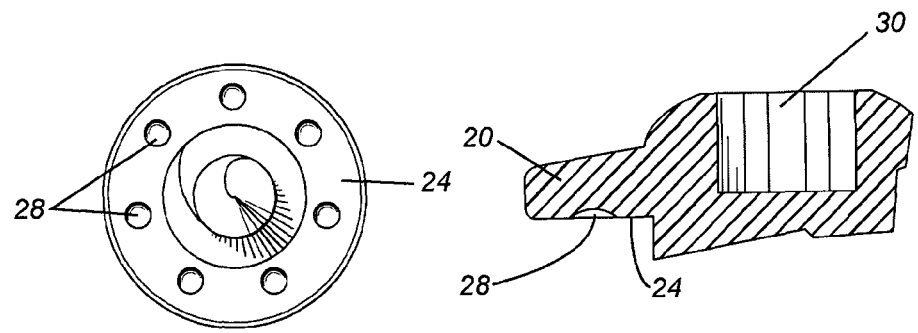
FIG. 5  FIG. 6
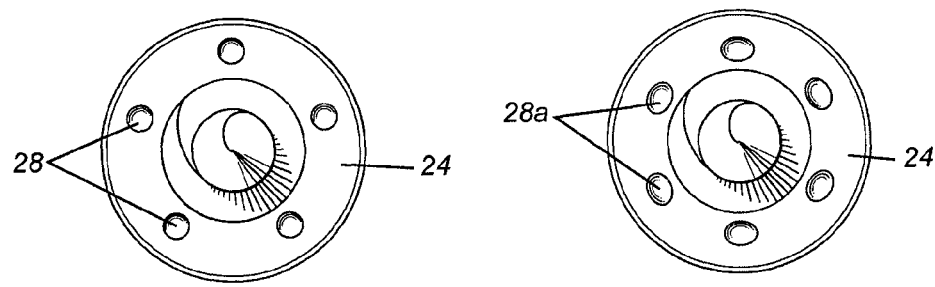
FIG. 7  FIG. 8
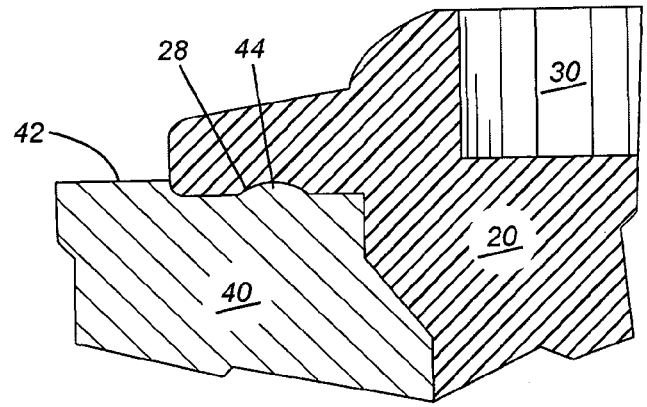
FIG. 9

SCREW HAVING UNDERSIDE POCKETS

CROSS-REFERENCE TO RELATED APPLICATIONS

This is the first application filed for the present invention.

TECHNICAL FIELD

The present invention relates generally to threaded fasteners and, in particular, to self-countersinking screws.

BACKGROUND

A self-countersinking, self-tapping screw for fibrous material such as wood, wood-like materials and composite materials is disclosed in Applicant's own Canadian Patent 2,198,832 (Walther et al.) which issued Apr. 16, 2002. This self-countersinking screw includes an inverted-conical head portion with a cavity adapted to receive a tip of a screwdriver and with a conical bottom having a plurality of triangular recesses each having a lateral side extending inwardly to form a sharp edge and a space for receiving chips. The sharp edge is designed to create a countersink when the screw penetrates into the workpiece. This self-countersinking screw can be inserted easily and efficiently.

One persistent problem with wood screws (or screws for any other fibrous material) is that they have a propensity to loosen over time. It would thus be highly desirable to provide an improved screw for fibrous material that not only is self-countersinking but is also less prone to loosening.

SUMMARY

In broad terms, the present invention provides a novel screw having one or more pockets on the underside of the screw head. In operation, the screw penetrates the surface of a material (i.e. a substrate or workpiece) until the underside of the head of the screw bears tightly against the surface of the material (substrate). As the head bears against this surface, material is forced (i.e. bulges or protrudes) into engagement with at least one of the pockets. In other words, these pockets receive at least some material as the head bears into the surface of the material. The engagement of the material into these pockets aids in restraining or locking the screw in place. The material that enters the pockets helps to prevent the screw from loosening or backing out.

Accordingly, one main aspect of the present invention is the provision of a screw having an elongated shank having a plurality of threads over at least a portion of the shank. The threads terminate in a tip at a first end of the shank. The tip and the threads are adapted to penetrate into a fibrous material. The screw also includes a head disposed at a second end of the shank. The head has a substantially flat underside for bearing against a surface of the fibrous material into which the screw is inserted. The screw further includes at least one material-receiving pocket formed in the underside of the head. The at least one pocket is adapted to receive at least some of the fibrous material when the head of the screw bears against the surface of the fibrous material. This screw may be a self-countersinking and/or self-tapping screw.

Another main aspect of the present invention provides a method of fastening a screw to a piece of fibrous material. The method entails positioning a tip of the screw against a surface of the fibrous material and applying torque to the screw to cause the screw to thread into the fibrous material until an underside of a head of the screw bears against the surface of the fibrous material. The torque is applied until some of the fibrous material at least partially enters one or more pockets formed in the underside of the head of the screw.

Yet a further main aspect of the present invention is a threaded fastener having a shank and a head at one end of the shank. The head has a substantially flat underside that acts as a washer for bearing against a surface of a material. The head further includes at least one pocket disposed around the shank to receive some of the material when the underside of the head of the fastener bears against the surface of the material. This threaded fastener may be a self-countersinking and/or self-tapping screw.

Yet another main aspect of the present invention is a self-tapping screw having an elongated shank having a plurality of threads over at least a portion of the shank, the threads terminating in a tip at a first end of the shank. The tip and the threads are adapted to penetrate into a fibrous material. The self-tapping screw has a head disposed at a second end of the shank, the head having a substantially flat underside for bearing against a surface of the fibrous material into which the screw is inserted. The self-tapping screw includes at least one material-receiving pocket formed in the underside of the head, the at least one pocket being adapted to receive at least some of the fibrous material when the head of the screw bears against the surface of the fibrous material.

BRIEF DESCRIPTION OF THE DRAWINGS

Further features and advantages of the present invention will become apparent from the following detailed description, taken in combination with the appended drawings, in which:

FIG. 1 is an isometric view of a novel screw having pockets in the underside of the head of the screw in accordance with a first embodiment of the present invention;

FIG. 2 is a top plan view of the screw of FIG. 1;

FIG. 3 is a side elevation view of the screw of FIG. 1;

FIG. 4 is a partial cross-sectional view of the screw taken through section 4-4 in FIG. 2;

FIG. 5 is a bottom plan view of the screw of FIG. 1;

FIG. 6 is an enlarged cross-sectional view of a portion of the screw of FIG. 1;

FIG. 7 is a bottom plan view of a screw having five round underside pockets in accordance with a second embodiment of the present invention;

FIG. 8 is a bottom plan view of a screw having six non-circular underside pockets in accordance with a third embodiment of the present invention; and FIG. 9 is an enlarged cross-sectional view of a portion the screw, depicting the bulging of the material into the pockets in the underside of the head.

It will be noted that throughout the appended drawings, like features are identified by like reference numerals. It should furthermore be noted that the drawings are not necessarily to scale.

DETAILED DESCRIPTION

In general, and by way of introduction, the present invention provides a novel screw such as, for example, a self-countersinking, self-tapping screw. This novel screw has a head with a substantially flat underside that acts as a washer for bearing against a surface of a material into which the screw is inserted. The novel screw includes one or more pockets on the underside of the head of the screw. When the head bears against a fibrous surface such as, for example, a surface made of wood or other lignocellulosic material, the head of the screw causes local compression or deformation of the material beneath the head. After the head has been pressed against the material, following installation, the material immediately beneath the pockets is not compressed or deformed, or at least not as much as the surrounding material. This uncompressed (or "less-compressed" material) expands and protrudes into engagement with the one or more pockets on the underside of the head as the head further presses into the material. In other words, the one or more pockets receive the fibrous material that protrudes or bulges upwardly as the material beneath the underside of the head is generally compressed. The material directly beneath the pockets rebounds or expands into the pockets as the head compresses the material. This engagement thereby locks the screw in place, i.e. the material extending, protruding or "bulging" into the one or more pockets precludes, or at least substantially inhibits, the screw from loosening over time.

By way of overview, FIGS. 1-8 depict three embodiments of the present invention which are presented solely by way of example to illustrate the invention. FIGS. 1-6 depict a first embodiment of the present invention in which the screw has a plurality of circular pockets disposed substantially symmetrically around the shank of the screw. FIG. 7 depicts a second embodiment of the present invention in which the screw has a different number of circular pockets in the underside of the head. FIG. 8 depicts a third embodiment of the present invention in which the screw has non-circular pockets. In this particular example, the non-circular pockets are ellipsoid or oblong. Other non-circular shapes may be employed without departing from the inventive concept(s) disclosed herein.

As shown in FIGS. 1-6, a screw generally designated by reference numeral 10 has an elongated shank 12 having a plurality of threads 14 over at least a portion of the shank, the threads terminating in a tip 16 at a first end 18 of the shank. In other words, the shank (also referred to as a stem) may have a threaded portion and a non-threaded portion. The screw also has a head 20 disposed at a second end 22 of the shank. The head has a substantially flat underside 24. This head may also be referred to herein as a washer, washer-head or washer-like head. Between the shank and the head may be a tapered (i.e. frusta-conical) intermediate (neck) portion as shown in the figures.

As further depicted in FIGS. 1-6, the screw has at least one pocket 28 for receiving fibrous material when the head of the screw bears against the material. In the exemplary embodiment depicted in FIGS. 1-6, there are seven circular pockets although, as noted above, the pockets may be varied in number, shape, disposition, etc. In terms of shape, the pockets may be any suitable recess, hole or cavity for receiving material but must be discrete pockets, not a continuous groove. Although the pockets are depicted as being symmetrically arranged around the shank, it should be understood that the pockets need not be symmetrically disposed around the shank.

In a variant, the pockets on the screw may comprise a mix of different sizes and shapes. For example, the screw may have circular pockets interspersed with non-circular pockets. As another example, the screw may have circular pockets of a first diameter interspersed with circular pockets of a second diameter.

For the purposes of the present specification, the expression "circular" (or "non-circular") in reference to the pockets means that the pockets have a circular (or non-circular) opening in the plane of the underside of the head. Accordingly, circular pockets may have different three-dimensional shapes. For example, the circular pockets may be spherically concave as shown by way of example in FIG. 4, conical, frusta-conical, cylindrical, etc. Analogously, non-circular pockets may have different three-dimensional shapes, all of which fall within the scope of this invention.

In the specific embodiment depicted by way of example in FIGS. 1-6, the screw has seven circular pockets disposed symmetrically around the shank. The shape, number and disposition of the pockets may be varied without departing from the inventive concept(s). For example, the pockets may be disposed exactly midway (in a radial direction) between the shank and the outer periphery of the head. Alternatively, in another embodiment, the pockets may be radially closer to the shank than to the outer periphery of the head. Conversely, in yet another embodiment, the pockets may be radially closer to the outer periphery than to the shank.

The screw also comprises a socket 30 into which a correspondingly shaped bit of a screwdriver may be inserted to apply torque to rotate the screw. One example of a socket is depicted in the drawings; however, it should be appreciated that any type of socket may be utilized with the embodiments of this invention.

In the second embodiment depicted by way of example in FIG. 7, the screw 10 has a different number of pockets 28. In the particular example depicted in FIG. 7, the screw has five circular pockets instead of seven pockets depicted in the embodiments of FIGS. 1-6. The number of pockets may of course be varied.

In the third embodiment depicted by way of example in FIG. 8, the screw 10 may have non-circular pockets 28. The non-circular pockets may be ellipsoid, oblong, square, rectangular or any other shape.

As may be seen in FIG. 9, regardless of their shape, number and disposition, these pockets 28, 28a receive material 44 that remains locally undeformed beneath the pockets 28, 28a when the head 20 compresses the surface 42 of the workpiece 40. In other words, as the head 20 presses into the workpiece 40, as depicted in FIG. 9, the workpiece 40 is generally deformed (compressed) beneath the head 20. However, the head does not directly compress the material 44 immediately beneath each pocket 28, 28a. The material 44 immediately beneath each pocket 28, 28a thus remains substantially uncompressed. This material 44 effectively protrudes or "bulges" up into the pockets 28, 28a as the head 20 is driven into tight engagement with the workpiece 40.

It is believed that, in some cases, depending on the fracture mechanics of the surface material, tiny shards or protruding fibers of the fibrous material may break off from the surface during compression and extend into or otherwise enter into one or more of the pockets. As the head of the screw presses into the material, the engagement of the material with the pockets helps lock the screw and prevent unwanted loosening in the future. In other cases, depending on the nature of the fibrous material in question, it is possible that some of the fibrous material at the surface may partially extrude into the pockets as the head is driven into the material. In addition, it is also hypothesized that possibly some debris (that is generated when the head grinds against the surface) may be collected in these pockets. Debris may help pack the fibrous material into the pockets to further secure the screw against unwanted loosening.

It has been found that the pockets increase the screw's resistance to loosening or backing out. In one test, two otherwise identical screws (one with five pockets, the other without) were inserted into a pressure-treated block of spruce-pine-fir wood commonly used for decks and exterior structures. Both screws were inserted with a torque of 10 ft-lbs as measured on a torque gauge. The torque required to undo the screw was then measured. Two such tests were performed. The screw without the pockets had a turn-out resistance of 5 ft-lbs on both tests whereas the screw with the pockets in the underside of the head had a turn-out resistance of 10 ft-lbs on the first test and 12 ft-lbs on the second test. These test results shows a substantial improvement in turn-out resistance, suggesting that the pockets engage with the upwardly bulging fibrous material to thereby lock the screw in place.

The novel screw disclosed herein also enables a novel method of fastening a screw to a piece of fibrous material. This method entails positioning a tip of the screw against a surface of the fibrous material. With a screwdriver, torque is applied to the screw, in the usual manner, to cause the screw to thread into the fibrous material. This is done until an underside of a head of the screw bears against the surface of the fibrous material. Torque is still applied until the material beneath the head is compressed. Because of the pockets, some of the fibrous material will remain at least partially uncompressed where the pockets interface with the surface of the material. As the head is pressed into the material, the substantially uncompressed material beneath the pockets will engage the pockets and lock the material to the screw. In other words, some material at the surface of the workpiece will at least partially enter into the one or more pockets formed in the underside of the head of the screw.

The screw described above and depicted in the attached drawings is designed primarily to be used with a fibrous material, e.g. wood, composites and other lignocellulosic materials. The embodiments of this invention may potentially be applied to other types of fasteners and materials where the pockets receive material that locks the screw against unwanted loosening. Accordingly, the present invention can be adapted to provide a fastener having a shank (or stem) and a head at one end of the shank, the head having an underside in which are disposed at least one pocket for receiving material when the head bears against a surface of the material. While the primary intention is to apply this technology to a screw, such as for example a self-countersinking, self-tapping screw, it could be applied in theory to other types of threaded fasteners.

The present invention has been described in terms of specific embodiments, examples, implementations and configurations which are intended to be exemplary or illustrative only. Other variants, modifications, refinements and applications of this innovative technology will become readily apparent to those of ordinary skill in the art who have had the benefit of reading this disclosure. Such variants, modifications, refinements and applications fall within the ambit and scope of the present invention. Accordingly, the scope of the exclusive right sought by the Applicant for the present invention is intended to be limited solely by the appended claims and their legal equivalents.

The invention claimed is:

1. A screw comprising:
    an elongated shank having a plurality of threads over at least a portion of the shank, the threads terminating in a pointed tip at a first end of the shank, the tip and the threads being adapted to penetrate into a material;
    a head disposed at a second end of the shank, the head having an underside surrounding the shank for bearing against a surface of the material into which the screw is inserted; and
    wherein the underside is entirely planar except for at least one material-receiving pocket formed in the underside of the head, the at least one pocket being adapted to receive at least some of the material when the head of the screw bears against the surface of the material, wherein the at least one pocket is spaced apart from the shank and also spaced apart from a periphery of the head.

2. The screw as claimed in claim 1 comprising a plurality of pockets disposed around the shank.

3. The screw as claimed in claim 1 comprising a plurality of pockets disposed symmetrically around the shank.

4. The screw as claimed in claim 1 comprising a plurality of substantially circular pockets.

5. The screw as claimed in claim 1 comprising a plurality of substantially non-circular pockets.

6. The screw as claimed in claim 1 comprising seven circular pockets symmetrically disposed around the shank.

7. The screw as claimed in claim 1 comprising five circular pockets symmetrically disposed around the shank.

8. The screw as claimed in claim 1 comprising six non-circular pockets symmetrically disposed around the shank.

9. The screw as claimed in claim 1 wherein the screw is a self-tapping screw.

10. A method of fastening a screw to a piece of material, the method comprising:
    positioning a pointed tip of the screw against a surface of the material; and
    applying torque to the screw to cause the screw to thread into the material until a substantially flat underside of a head of the screw that surrounds a shank of the screw bears against the surface of the material, the underside being entirely planar except for one or more pockets formed in the underside of the head of the screw, the torque being applied until some of the material at least partially enters the one or more pockets formed in the underside of the head of the screw, wherein the one or more pockets are spaced apart from the shank and also spaced apart from a periphery of the head.

11. The method as claimed in claim 10 wherein the material at least partially enters a plurality of circular pockets formed in the underside of the head.

12. The method as claimed in claim 10 wherein material at least partially enters a plurality of non-circular pockets formed in the underside of the head.

13. The method as claimed in claim 10 wherein the screw is a self-tapping screw.

14. A threaded fastener comprising:
    a shank having threads and having a pointed tip; and
    a head at one end of the shank, the head having a substantially flat underside that acts as a washer for bearing against a surface of a material, the underside of the head being entirely planar except for a plurality of pockets disposed around, and spaced apart from, the shank to receive some of the material when the underside of the head of the fastener bears against the surface of the material, wherein the pockets are also spaced apart from a periphery of the head.

15. The fastener as claimed in claim 14 wherein the plurality of pockets are circular pockets disposed symmetrically around the shank.

16. The fastener as claimed in claim 14 wherein the plurality of pockets are non-circular pockets disposed symmetrically around the shank.

17. The fastener as claimed in claim 14 comprising seven pockets.

18. The fastener as claimed in claim 14 wherein the fastener is a self-tapping screw.

19. A self-tapping screw comprising:
    an elongated shank having a plurality of threads over at least a portion of the shank, the threads terminating in a pointed tip at a first end of the shank, the tip and the threads being adapted to penetrate into a material;

a head disposed at a second end of the shank, the head having an underside that surrounds the shank for bearing against a surface of the material into which the screw is inserted; and wherein the underside is entirely planar except for at least one material-receiving pocket formed in the underside of the head, the at least one pocket being adapted to receive at least some of the material when the head of the screw bears against the surface of the material, wherein the at least one pocket is spaced apart from the shank and also spaced apart from a periphery of the head.

20. The self-tapping screw as claimed in claim 19 comprising a plurality of circular pockets disposed around the shank.

* * * * *